United States Patent Office 3,733,304
Patented May 15, 1973

---

3,733,304
ARYL SULFATE POLYMERS AND METHODS FOR THEIR PRODUCTION
William Charles Firth, Jr., Wilton, Conn., assignor to American Cyanamid Company, Stamford, Conn.
No Drawing. Filed Apr. 1, 1971, Ser. No. 130,528
Int. Cl. C08g 33/14
U.S. Cl. 260—49
10 Claims

ABSTRACT OF THE DISCLOSURE

A method for the production of compounds having the formula $$F\text{—}SO_3\text{—}A\text{—}SO_3\text{—}F$$

wherein A is an aromatic radical, polymers produced from said compounds and methods for the production of said polymers, are disclosed.

BACKGROUND OF THE INVENTION

The production of various polymers having sulfur linkages in the backbone thereof are known in the art. For example, polysulfonates produced from diphenols and disulfonyl halides are disclosed and claimed in U.S. Pat. No. 3,236,808. Sulfonate-carboxylate copolymers are set forth in U.S. Pat. No. 3,262,914, while U.S. Pat. No. 3,228,912 teaches the production of polysulfonates by reacting a vinyl sulfonic acid ester of an organic polyol with an organic nitrogen compound containing amino, amido or imino groups. Additionally, U.S. Pat. No. 3,401,-148 is directed to the production of sulfur-containing polyesters by reacting a diphenol with a diacid chloride in an inert organic solvent and in the presence of an aliphatic tertiary amine.

SUMMARY

I have now discovered a unique class of sulfur-containing polymers which have a high molecular weight and are useful for a multiplicity of applications. My polymers are the first aryl sulfate polymers known. The polymers have high molecular weights as measured by inherent viscosities and are useful in film forming, as molded objects, as fibers and the like. They also find utility as additives by blending them via known procedures with other resinous materials such as vinyl polymers, alkyd resins, aminoplast resins and the like.

DESCRIPTION OF THE INVENTION INCLUDING PREFERRED EMBODIMENTS

The novel method of production of the above-mentioned monomers comprises reacting an aromatic dihydroxy compound with sulfuryl fluoride according to the equation $$HO\text{—}A\text{—}OH + SO_2F_2 \rightarrow F\text{—}SO_3\text{—}A\text{—}SO_3\text{—}F$$

wherein A is an aromatic radical.

The reaction may be conducted at a temperature of from about 50° C. to about 250° C., preferably about 80° C. to about 150° C. Superatmospheric pressure is preferably employed but subatmospheric or atmospheric pressure may be used if necessary or desired. Equimolar amounts of each reactant can be employed, however, it is preferred that an excess of the fluoride be used in order to assure complete reaction. The reaction is generally complete in about 6 hours at about 120° C., however, reaction times ranging from about a few minutes to 24 hours may be used depending upon the reaction temperature and the degree of conversion required, the lower the temperature and higher the conversion, the longer the contact time.

The reaction is preferably conducted in the presence of a solvent which acts as an acid acceptor with such materials as tertiary amines, i.e. pyridine, triethyl amine, methyl pyridine and the like being exemplary.

Examples of materials which may be reacted with sulfuryl fluoride according to the above equation include:

2,2-bis-(4-hydroxyphenyl)-propane (bisphenol-A);
bis-(2-hydroxyphenyl)-methane;
bis-(4-hydroxyphenyl)-methane;
1,1-bis-(4-hydroxyphenyl)-ethane;
1,2-bis-(4-hydroxyphenyl)-ethane;
1,1-bis-(2-chloro-4-hydroxyphenyl)-ethane;
1,1-bis-(2,5-dimethyl-4-hydroxyphenyl)-ethane;
2,2-bis-(4-hydroxynaphthyl)-propane;
2,2-bis-(4-hydroxyphenyl)-pentane;
2,2-bis-(4-hydroxyphenyl)-hexane;
bis-(4-hydroxyphenyl)-phenylmethane;
bis-(4-hydroxyphenyl)-cyclohexylmethane;
1,2-bis-(4-hydroxyphenyl)-1,2-bis-(phenyl)-ethane;
2,2-bis-(4-hydroxyphenyl)-1-phenylpropane;
bis-(4-hydroxy-5-nitrophenyl)-methane;
bis-(4-hydroxy-2,6-dimethyl-3-methoxyphenyl)-methane;
2,2-bis-(2,6-dichloro-4-hydroxyphenyl)-propane;
2,2-bis-(2-bromo-4-hydroxyphenyl)-propane,
tetrabromobisphenol A, and the like.

The preparation of these and other applicable compounds is known in the art. They are most commonly prepared by condensation of two moles of a phenol with a single mole of a ketone or aldehyde under known reaction conditions.

Also useful as charge materials in my novel process are the dihydroxybenzenes typified by hydroquinone and resorcinol; the dihydroxybiphenyls such as 4,4'-dihydroxybiphenyl; 2,2' - dihydroxybiphenyl; 2,4'-dihydroxybiphenyl and the dihydroxynaphthalenes such as 2,6-dihydroxynaphthalene, etc.

Dihydroxyaryl sulfones are also useful as charge materials. Sulfones such as bis-(4-hydroxyphenyl)-sulfone; 2,4'-dihydroxyphenyl sulfone; 2,4'-dihydroxy-5'-chlorophenyl sulfone; 3'-chloro-4,4'-dihydroxyphenyl sulfone; bis-(4-hydroxyphenyl)-biphenyl disulfone, etc. being exemplary. The preparation of these and other useful dihydroxyarylsulfones is described in Pat. 2,288,282 to Huissmann. Polysulfones, as well as sulfones substituted with halogen, nitro, alkyl and other substituents are also useful. In addition, related sulfides and sulfoxides are applicable.

Dihydroxyaromatic ethers are also useful and may be prepared by methods found in Pat. 2,739,171 to Linn, and in "Chemical Reviews," 38, 414–417 (1946). Typical of such dihydroxyaryl ethers which may be reacted with sulfuryl fluoride according to my novel method are the following:

4,4'-dihydroxyphenyl ether;
4,4'-dihydroxy-2,6-dimethylphenyl ether;
4,4'-dihydroxy-3,3'-diisobutylphenyl ether;
4,4'-dihydroxy-3,3'-diisopropylphenyl ether;
4,4'-dihydroxy-3,2'-dinitrophenyl ether;
4,4'-dihydroxy-3,3'-dichlorophenyl ether;
4,4'-dihydroxynaphthyl ether;
4,4'-dihydroxy-2,6-dimethoxyphenyl ether, and the like.

The many other types of suitable dihydroxyaryl compounds will be apparent to those skilled in the art.

The bisfluorosulfate monomers produced according to my novel process are generally white solids which melt without decomposition. They appear to be quite unreactive to hydroxylic reagents such as atmospheric moisture or alcohols, from which they can be recrystallized.

The novel aromatic polysulfate polymers of the instant invention have the formula (I) 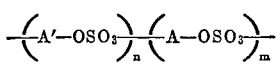

wherein A and A' are the same or different aromatic radicals, $n$ is a whole positive integer greater than 2 and $m$ is an integer of no less than zero, the ratio of $n:m$ being 1:0 to 1:10.

The polymers of Formula I may be produced by either of two analogous methods according to the equations (A)

$$XO-A'-OX + F-SO_3-A-SO_3-F \longrightarrow$$

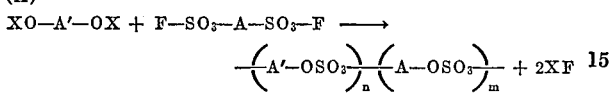 $+ 2XF$ (B)

$$XO-A'-OX + XO-A-OX + SO_2F_2 \longrightarrow$$

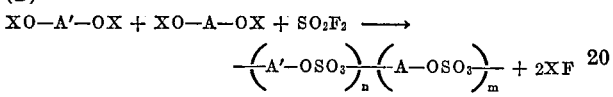 $+ 2XF$ wherein X is a cation and A, A', $n$ and $m$ are as defined above.

In order to achieve high molecular weight polymers of good color according to Equation A, the bisfluorosulfates must be substantially purified. The crude products are brown and often contain some unchanged phenolic groups. Two recrystallizations from isopropanol, along with decolorizing charcoal treatments, remove the bulk of the color and phenolic impurities. Final purification can be achieved by recrystallization from hexane using decolorizing charcoal.

As is well known to those skilled in the art, only a few reactions occur completely enough to permit the formation of high molecular weight condensation polymers. It is therefore surprising that high molecular weight aromatic polysulfates could be prepared by the new reaction of the bisfluorosulfates with salts of dihydroxyaromatic compounds according to the Equation A.

The salts employed as starting materials in producing my novel polymers according to Equations A and B, above, are well known to those skilled in the art. Illustrative compounds include the alkali metals, e.g. potassium and sodium, salts of the dihydroxy aromatic compounds set forth in the paragraphs above. They may be used alone or as mixtures with one another the use of mixtures resulting in random copolymers, as indicated above.

The polymerization reaction is carried out via Equation A using a molar ratio of salt to fluoride of exactly 1:1, within our ability to measure. If a lower molecular weight is desired, an excess of one of the reagents can be used, or a monofunctional chain terminator can be added.

The polymerizations according to either Equation A or B are allowed to proceed for about two hours, i.e. until essentially complete conversion is achieved, although longer or shorter reaction times may be used.

Temperatures ranging from about 25° C. to about 250° C. may be used. When dimethyl sulfoxide is the solvent a range of from about 155° C. to about 174° C. is preferred. Atmospheric pressure is preferred, but subatmospheric or superatmospheric pressure can be used.

The polymerizations are preferably conducted in the presence of a solvent such as dimethyl sulfoxide, tetrahydrothiophene-1,1-dioxide, tetrahydrothiophene-1-monoxide, dimethyl sulfone, diethyl sulfoxide, diethyl sulfone, dipropyl sulfone, diphenyl sulfone and the like.

The polysulfates produced according to Equations A and B, above, are produced in admixture with low molecular weight, predominately cyclic oligomers which may be present in amounts of up to about 25%, by weight. The high molecular weight products may be separated from the oligomers by repeated washings with solvent, precipitations and filtrations, as described in the examples.

Additionally, I may form block copolymers containing the aromatic polysulfate structure by mixing together two or more low molecular weight polysulfates of diphenols etc. and extending the resultant materials with difunctional compounds such as bischloroformates, diisocyanates, dibasic acids or esters etc. to produce mixed poly(sulfate/carbonates), poly(sulfate/urethanes), poly(sulfate/esters) and the like.

My polymers are a versatile and useful class of polymers and, in particular, their stability with respect to hydrolysis is excellent. This stability is important in all applications requiring exposure to moisture or humidity at elevated temperatures where retention of physical, electrical and chemical properties is required. The combination of high softening temperature, desirable strength characteristics and thermal and chemical stability make these compositions useful as thermoplastic molding compounds for the fabrication of molded gaskets, tubing, gears etc. either alone or combined with such fillers as silica, carbon black, wood flour etc. Films thereof are useful as packaging material, containers, covers, liners, insulation, recording tapes, photographic film base, pipe wrappings, etc. They may be oriented or drawn at suitable temperatures to permit enhancement of strength properties such as tensile and flexural strengths and may be amorphous or crystalline. Fibers may also be readily formed by melt or solution spinning and are useful as yarn, thread, bristle, rope and the like. The polymers of this invention may be readily pigmented or dyed, suitable stabilizers and plasticizers as are known in the art may be incorporated therein and alloying with other resinous materials may be accomplished. The present compositions may also be used as surface coatings in paints, varnishes and enamels and their powerful adhesive qualities render them particularly useful as adhesives for plastic, rubber, metal, glass or wood parts.

The following examples are set forth for purposes of illustration only and are not to be construed as limitations on the present invention except as set forth in the appended claims. All parts and percentages are by weight, unless otherwise specified.

Example 1

A stainless steel autoclave is charged with 228.3 parts of bisphenol A and 791 parts of pyridine, cooled to −78° and evacuated and filled with nitrogen three times. Sulfuryl fluoride (204 parts) is then added and the mixture is heated for 19 hours at 118–120°. During this time the gauge pressure drops from 350 p.s.i. to zero. A solution of the reaction product in methylene chloride is extracted with cold dilute hydrochloric acid and then with water and finally dried with sodium sulfate. The amber solution is heated at reflux with decolorizing charcoal and filtered. The methylene chloride is removed under vacuum and the residue recrystallized twice from isopropanol (decolorizing charcoal) at −13°. The yield at this stage is 206 parts.

The product is then recrystallized twice from hexane (decolorizing charcoal) at −25° with the exclusion of moisture. The yield of white bisfluorosulfate,

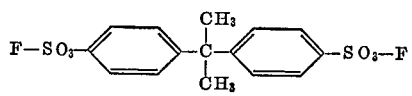

is 134 parts, M.P. 49–50°.

The analytical sample is made in another run and purified by several recrystallizations from isopropanol (decolorizing charcoal); M.P. 49–50°.

*Analysis.*—Calcd. for $C_{15}H_{14}F_2O_6S_2$ (percent): C, 45.91; H, 3.60; F, 9.68. Found (percent): C, 46.11; H, 3.66; F, 9.70, 9.73.

Example 2

The procedure of Example 1 is again followed except that the reaction is carried out at 120° for 6.5 hours. Similar results are obtained.

Example 3

The same quantities of reagents and procedures are used as in Example 1, except that the sulfuryl fluoride is increased to 255 parts and the reaction mixture is heated at 120° for 6 hours. An excellent yield of the bisfluorosulfate of bisphenol A is recovered.

Example 4

The same quantities and procedures as in Example 1 are used, except that the sulfuryl fluoride is increased to 251 parts and the reaction mixture is heated for 18 hours at 80°. The product is isolated in the usual way and then recrystallized twice from isopropanol and twice from hexane. The yield is 119 parts of the bisfluorosulfate.

Example 5 p,p'-Biphenol (50 parts), pyridine (212 parts) and sulfuryl fluoride (59 parts) are allowed to react as in Example 1 for 17 hours at 120–124°. The yield of crude product after the usual work up is 71.5 parts of brown solid. The product is recrystallized twice from isopropanol (decolorizing charcoal) and twice from hexane. The yield is 25 parts of white solid,

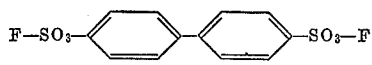

M.P. 94–95° C. (W. Lange et al., Ber., 63B, 2653 (1930) report an M.P. of 94.8° C. for this compound.)

Example 6

2,2-bis(3,5 - dibromo - 4 - hydroxyphenyl)-propane (250 parts), pyridine (368 parts) and sulfuryl fluoride (117 parts) are combined as in Example 1 and heated for 6 hours at 120°. The product is isolated in the usual way. The brown taffy-like material crystallizes when triturated with isopropanol. After one recrystallization from isopropanol and two recrystallizations from hexane using decolorizing charcoal a white solid

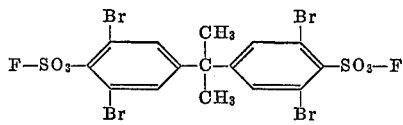

(62 parts), M.P. 128.5–131.5°, is obtained. Nuclear magnetic resonance analysis indicates the presence of some phenolic groups.

*Analysis.*—Calcd. for $C_{15}H_{10}Br_4F_2O_6S_2$ (percent): F, 5.37. Found (percent): 3.73.

Example 7

Hydroquinone (110 parts), pyridine (700 parts) and sulfuryl fluoride (260 parts) are combined as in Example 1 and heated for 6 hours at 120° C. After isolation, the crude product is recrystallized from isopropanol and from a hexane-isopropanol mixture. The yield is 181 parts,

M.P. 98–99° C.

*Analysis.*—Calcd. for $C_6H_4F_2O_6S_2$ (percent): C, 26.28; H, 1.47; S, 23.39. Found (percent): C, 26.81; H, 1.99; S, 23.89.

Example 8

4,4'-dihydroxydiphenyl sulfone (95%—4,4'-isomer, 168 parts), pyridine (675 parts) and sulfuryl fluoride (175 parts) are combined as in Example 1 and heated for 6 hours at 120° C. After isolation the crude product is recrystallized from isopropanol.

The yield is 40 parts,

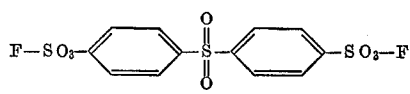

M.P. 118–124° C.

*Analysis.*—Calcd. for $C_{12}H_8F_2O_8S_3$ (percent): C, 34.78; H, 1.95; S, 23.21; F, 9.17. Found (percent): C, 35.78; H, 1.96; S, 23.18; F, 8.85.

Example 9

As argon purge is used throughout this example except for brief interruptions during additions of solid reagents to the reactor.

The following preparation of the disodium salt of bisphenol A is similar to one described by R. N. Johnson et al., J. Polymer Sci.; Part A–1, 5, 2375 (1967). A 4-neck, Pyrex glass reactor is equipped with an argon inlet tube leading to the bottom thereof, a stopper, a thermometer or thermocouple and a fractionating column. The column is equipped with a still head, a receiver and adapters which allow the distillate to be returned to the flask when desired.

The apparatus is purged with argon. Aqueous 50% sodium hydroxide solution containing 7.852 parts of sodium hydroxide is then added and rinsed in with 4 parts of distilled water. Bisphenol A (22.4042 parts) is added and rinsed in with 220 parts of dimethyl sulfoxide (distilled from calcium hydride). Chlorobenzene (550 parts) is added, and the stopper is replaced with a stirrer. The mixture is stirred at room temperature for about one-half hour.

The resultant mixture is stirred and heated to remove the water by azeotropic distillation. During the early parts of the distillation, part of the chlorobenzene layer in the distillate is gradually returned to the reactor. The return of chlorobenzene is discontinued when the temperature of the reaction mixture reaches approximately 140° C. Distillation is continued until distillation of the chlorobenzene is essentially complete and the temperature of the reactants reaches about 160° C. The resultant solution of the disodium salt of bisphenol A is cooled to room temperature and the distillation apparatus is removed.

The solid bisfluorosulfate of bisphenol A of Example 1 (38.5109 parts) is added to the disodium salt using dried apparatus and rinsed in with 38 parts of chlorobenzene. The reaction mixture is heated with an oil bath to 150° C. over one hour and then heated for a second hour at 150–165° C. Chlorobenzene is allowed to distill out of the reactor through a gas exit tube.

During the next one-half hour, the reactor is periodically removed from the bath and tipped to bring the liquid phase in contact with solid which adheres to the reactor walls above the liquid level. Each time, the heating and stirring are resumed until the temperature of the reaction mixture reaches 160° C. Essentially all of the solid must react for high molecular weight polymer to be obtained.

Solid precipitates when the reaction mixture is allowed to stand overnight before work up. An additional 220 parts of dimethyl sulfoxide are added, and the solid redissolved at 150° C. The solution is then quickly cooled and the product precipitated by gradual addition of the solution to water in a blendor. The precipitated solid is recovered by filtration and thoroughly washed with water. The yield is 53 parts of white, fibrous polymer; inherent viscosity in dimethylformamide (DMF) (at 30°, 0.5% concentration): 0.46.

Example 10a

A polymerization product (100 parts), similar to that of Example 9, is dissolved in dimethyl formamide (660 parts) at 120° C. and cooled to room temperature. Solid precipitates from solution. The solution is clarified by centrifugation and pressure filtration before the polymer is precipitated with water, collected by filtration and washed. The polymer is stirred with methanol (870 parts) for 45 minutes, collected by filtration, washed, with methanol and dried under vacuum at 80–86°. The recovery is 88 parts.

In addition to the peaks for the polymer, the nuclear magnetic resonance spectrum shows one-half of an $A_2B_2$ pattern centered at $6.92\delta$, which is caused by aromatic protons of the cyclic sulfate oligomers described in Example 12. Based on the spectrum, the amount is 8%, by weight.

Example 10b

A polysulfate sample similar to that of Example 9 (80 parts) but containing approximately 21% of oligomer, as determined by nuclear magnetic resonance, is dissolved in 75 parts of dimethylformamide at 120° C. The solution is decanted from a small amount of insoluble material and allowed to stand overnight. Solid precipitates.

The supernatent liquid is separated and added to stirred water to precipitate the polymer, which contains about 10% oligomer according to nuclear magnetic resonance analysis.

Example 11

Polysulfate product from Example 10a is reprecipitated four times from dimethylformamide solution with methanol. The product is free of the oligomer according to nuclear magnetic resonance.

*Analysis.*—Calcd. for $C_{15}H_{14}O_4S$ (percent): C, 62.05; H, 4.86; S, 11.04; F, 0.0. Found (percent): C, 62.34; H, 4.84; S, 11.18; F, 0.024.

The properties of molded articles produced from the polymers of Examples 10a and 11 are set forth in Table I, below.

TABLE I

| Property | Example 10a polymer | Example 11 polymer |
|---|---|---|
| Transparency | Opaque | Transparent. |
| X-ray diffraction pattern | Amorphous-crystalline. | Amorphous. |
| Color | Pale amber | Pale amber. |
| Flexural strength, p.s.i | 16,700 | 15,160. |
| Flexural modulus, p.s.i | 518,000 | 396,000. |
| Tensile strength, p.s.i | 9,000 | 9,000. |
| Tensile modulus, p.s.i | | 325,000. |
| Percent elongation, yield | | 3.6. |
| Percent elongation, break | 4 [1] | 18 to >70. |
| Izod impact strength (ft. lb./in. notch), ⅛" thick specimen. | 0.42 | 0.45. |
| $T_g$ (DTA), ° C | 93 | 93 to 95. |
| $T_{dec.}$ (TGA), ° C | 310 | Ca. 300. |
| Limiting oxygen index | Ca. 23 | 23.5. |
| NaOH hydrolysis, percent weight loss.[2] | 0 | 0. |
| Rockwell hardness, "M" scale | 46 | 46. |
| Density, g./cc | 1.33 | 1.32. |

[1] Modified test; results not exactly comparable.
[2] After 20 hours in boiling NaOH solution (10 gms./100 ml. H₂O).

Example 12

The methanol-dimethylformamide filtrate from the first reprecipitation in Example 11 is filtered twice through a filter aid, concentrated and diluted with water. The precipitate is collected, dried and reprecipitated from dimethylformamide with water. The white solid product, M.P.> 300°, has an infrared spectrum very similar to that of the high molecular weight polymer. No hydroxyl or other end groups are indicated by the spectrum. A gel permeation chromatography curve shows that the material is of low molecular weight and indicates the presence of two components. The nuclear magnetic resonance spectrum of the aromatic protons appears as an $A_2B_2$ pattern (one-half centered at $6.90\delta$, the other at $7.28\delta$) with a less intense single peak at $7.36\delta$.

*Analysis.*—Calcd. for $C_{15}H_{14}O_4S$ (percent): C, 62.05; H, 4.86; F, 0.00; S, 11.04. Found (percent): C, 62.35; H, 5.08; F, 0.033; S, 10.96.

Taken together, the above data show that this material is a mixture of low molecular weight, cyclic, sulfate oligomers of bisphenol A.

Example 13

The apparatus and technique are similar to Example 9. Sodium hydroxide (19.204 parts), as a 50% aqueous solution, is rinsed into the reactor with 40 parts of distilled water. p,p'-Biphenol (44.694 parts), dimethyl sulfoxide (495 parts) and chlorobenzene (605 parts) are added and the water and chlorobenzene are removed by azeotropic distillation. An additional 550 parts of chlorobenzene are added and removed by distillation, with partial recycling of the chlorobenzene, to complete the drying. The disodium salt of p,p'-biphenol in dimethyl sulfoxide is recovered.

The bisfluorosulfate of p,p'-biphenol (84.082 parts) from Example 5, is added to the above salt mixture as a slurry with 110 parts of dry chlorobenzene and rinsed in with 110 parts of additional chlorobenzene. The temperature of the mixture is raised to 147° C. and held at 145–169° C. for 1.6 hours. The chlorobenzene is allowed to distill out. Occasionally the flask is tipped to permit reaction of solid on the walls above the liquid level. When all of this solid reacts, an extremely viscous mix is obtained.

The reaction mixture is cooled and diluted with 1100 parts of dimethyl sulfoxide. The mixture is added to water, and the polymer (112 parts) is isolated by filtration. After reprecipitation from dimethylformamide solution with water the polymer amounts to 95 parts; glass transition temperature: 114–117° C. (by differential thermal analysis); inherent viscosity: 0.75 (DMF, 0.5%, 30°).

*Analysis.*—Calcd. for $C_{12}H_8O_4S$ (percent): C, 58.05; H, 3.25; S, 12.92. Found (percent): C, 58.79; H, 3.37; S, 13.39, 13.74.

Example 14

The procedure of Example 9 is again followed except that the bisfluorosulfate of bisphenol A is replaced by an equivalent amount of the bisfluorosulfate of tetrabromobisphenol A of Example 6. An excellent yield of the resultant polymer is recovered.

Example 15

The bisfluorosulfate of hydroquinone of Example 7 is substituted for the bisfluorosulfate of Example 9 and the procedure thereof is then followed. The resultant polymer is recovered after purification similar to that of Example 13.

Example 16

Again following the procedure of Example 9, the bisfluorosulfate of 4,4'-dihydroxybiphenyl of Example 5 is reacted with the dipotassium salt of 4,4'-dihydroxybiphenyl. The polymer which results is recovered in high yield.

Example 17

The apparatus and technique of Example 9 are again used. Sodium hydroxide (17.856 parts), as a 50% aqueous solution, is rinsed into the reactor with 40 parts of distilled water. p,p'-Biphenol (41.558 parts), dimethyl sulfoxide (220 parts), and chlorobenzene (550 parts) are added. The water and chlorobenzene are removed by azeotropic distillation with partial recycling of the chlorobenzene. An additional 275 parts of dimethyl sulfoxide and 550 parts of chlorobenzene are then added, and the chlorobenzene is removed by distillation. A high yield of the disodium salt of p,p'-biphenol results.

The residue is cooled to room temperature. The bisfluorosulfate of bisphenol A (87.573 parts) of Example 1 is added as a solution in 55 parts of dry chlorobenzene and rinsed in with 55 additional parts of chlorobenzene. The mixture is stirred for ten minutes, then the temperature is raised and the mixture is heated at 143–167° C. for 1.2 hours. During this time, the flask is occasionally tipped to rinse down the solid on the walls.

The viscous mixture is cooled to 60° C. and diluted with 550 parts of dimethyl sulfoxide before the polymer is precipitated with water to give 99 parts of product. The polymer is reprecipitated from dimethylformamide with water. The product (87 parts) has a glass transition temperature of 101° C. as determined by differential thermal analysis; nuclear magnetic resonance gives a ratio of methyl to aromatic protons of 6:16; inherent viscosity: 0.56 (DMF, 30°, 0.5% concentration).

Analysis.—Calcd. for $C_{27}H_{22}O_8S_2$ (percent): C, 60.21; H, 4.12; S, 11.91. Found (percent): C, 60.45; H, 4.05; S, 11.99, 11.84.

Example 18

This reaction is carried out under argon with the exclusion of atmospheric moisture.

A glass reactor containing a magnetic stirring bar is dried, evacuated and filled with argon. 3.3120 parts of a solution of sodium methoxide in methanol, containing 0.9798 part of sodium methoxide, are then added. This is followed by 2.0699 parts of bisphenol A and 7.9 parts of a methanol rinse.

A homogeneous solution is obtained and the methanol is then removed under vacuum. The residual disodium salt of bisphenol A is dried under vacuum for 18 hours at 84° C.

The reactor is purged with argon and 3.5580 parts of the bisfluorosulfate of bisphenol A of Example 1 are added and rinsed in with 17 parts of dry, distilled sulfolane. The reaction mixture is heated and stirred for five hours at 200° C.

After cooling, the mixture is shaken with 75 parts of water. The water-insoluble polymeric product amounts to 5.2 parts, inherent viscosity 0.29 (DMF, 30°, 0.5% concentration).

Example 19

The disodium salt of bisphenol A is prepared closely following the procedure of Johnson et al., above, except that the sodium hydroxide solution is rinsed quantitatively into the reactor with a total of 15 parts of distilled water. The water is removed by azeotropic distillation with chlorobenzene. After the resultant disodium salt (61 parts) dissolves in the dimethyl sulfoxide (138 parts) at 157° C., sulfuryl fluoride is bubbled into the solution. There is a rapid exotherm to 180° C. The addition of sulfuryl fluoride is briefly interrupted until the temperature drops to 157° C. The temperature is then kept between 152 and 162° C. for the remainder of the reaction (1.75 hours). At the end of this time the mixture is viscous, but the viscosity is not increasing noticeably. A total of 46 parts of sulfuryl fluoride are passed into the solution.

The resultant polymer (64 parts) is isolated by precipitation with water; inherent viscosity 0.15 (DMF, 30°, 0.5% concentration); nuclear magnetic resonance indicates an oligomer content of 4%, by weight.

Example 20

Following the procedure of Example 19 except that an equivalent amount of the disodium salt of p,p'-biphenol of Example 13 is substituted for the disodium salt thereof, a polymer in high yield is recovered.

Example 21

Again following the procedure of Example 19 except that the disodium salt of 2,2-bis(3,5-dibromo-4-hydroxyphenyl)-propane is used, similar results are recorded.

Example 22

The dipotassium salt of hydroquinone is substituted for the salt of Example 19, all else remaining equal. A similar yield of polymer is recovered.

Example 23

Again following the procedure of Example 19, a high yield of polymer is recovered when the salt thereof is replaced by an equivalent amount of the disodium salt of 4,4-dihydroxybiphenyl.

Example 24

The procedure of Example 19 is followed with substitution of the disodium salt of 4,4'-dihydroxydiphenyl sulfone for the disodium salt utilized therein. A high molecular weight polymer, as determined from the inherent viscosity, is recovered.

Example 25

A low molecular weight polysulfate of bisphenol A with hydroxyl end groups is prepared as in Example 9, except that 24.6446 parts of bisphenol A are used. The polymer is precipitated with cold, dilute hydrochloric acid, washed thoroughly with water and dried.

Similarly, a low molecular weight polysulfate of p,p'-biphenol is prepared as in Example 13, but using 49.163 parts of p,p'-biphenol.

A solution of 5 parts of bisphenol A product and 5 parts of p,p'-biphenol product in 250 parts of pyridine is stirred, and phosgene is slowly passed into the solution. The resulting block copolymer is reprecipitated and washed thoroughly with water. The inherent viscosity is 0.4.

Example 26

The dipotassium salt of bisphenol A is prepared from a solution of potassium t-butoxide in methanol using a procedure similar to Example 18. The salt (2.9707 parts) is dried under vacuum for 18 hours at 110° C.

22 parts of dimethyl sulfoxide are then added and the mixture is stirred to dissolve most of the salt before 22 parts of chlorobenzene are added. The resulting heterogeneous mixture is heated, and the chlorobenzene is removed under vacuum until the solid potassium salt of bisphenol A dissolves. The mixture is cooled to room temperature and blanketed with argon.

Bisfluorosulfate of bisphenol A (3.8286 parts) prepared as in Example 1 is added and rinsed in with 2 parts of chlorobenzene. The reaction mixture is stirred and heated to 174°, then held at 174° for one hour.

The cool mixture is treated with water, and the insoluble polymeric product is separated, washed with water and dried. The yield is 5.0 parts, inherent viscosity 0.23 (DMF, 30°, 0.5% concentration).

I claim:

1. A polymer capable of forming a film and having the formula

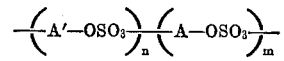

wherein A and A' are the same or different aryl radicals of 6–26 carbon atoms, $n$ is a whole positive integer greater than 2, $m$ is an integer of 0 or more and the ratio of $n:m$ is from about 1:0 to about 1:10.

2. A polymer according to claim 1 wherein A' is

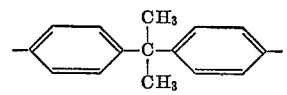

and $m$ is 0.

3. A polymer according to claim 1 wherein A' is

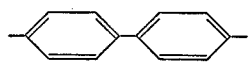

and $m$ is 0.

4. A polymer according to claim 1 wherein A' is

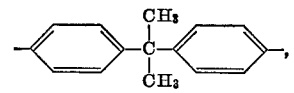

A is

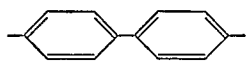

and m is greater than 0.

5. A polymer according to claim 1 wherein A' is

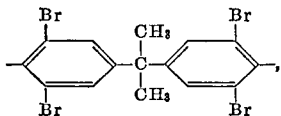

A is

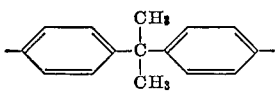

and m is greater than 0.

6. A polymer according to claim 1 wherein A is

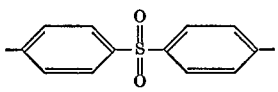

and m is 0.

7. A method for the production of the polymers of claim 1 which comprises reacting a compound having the formula (I)              F—SO$_3$—A—SO$_3$—F wherein A is an aryl radical, with a compound having the formula (II)             XO—A'—OX wherein A' is an aryl radical and X is an alkali metal cation, at a ratio of I:II of about 1:1 at a temperature ranging from about 25° C. to about 250° C.

8. A method for the production of the polymers of claim 1 which comprises reacting (III) sulfuryl fluoride with a compound having the formula (IV)             XO—A'—OX or (V) a mixture of (IV) and a compound having the formula

XO—A—OX wherein A' and A are aryl radicals and X is an alkali metal cation, at a ratio of (III):(IV) or (V) of about 1:1 and at a temperature ranging from about 25° C. to about 250° C.

9. A method for the production of the polymers of claim 1 which comprises reacting a compound having the formula (I)             F—SO$_3$—A—SO$_3$—F wherein A is an aryl radical, with a compound having the formula (II)             XO—A'—OX wherein A' is an aryl radical and X is an alkali metal cation, with an excess of either (I) or (II) and at a temperature ranging from about 25° C. to about 250° C.

10. A method for the production of the polymers of claim 1 which comprises reacting (III) and sulfuryl fluoride with a compound having the formula (IV)             XO—A'—OX or (V) a mixture of (IV) and a compound having the formula

XO—A—OX wherein A' and A are aryl radicals and X is an alkali metal cation with an excess of either (III), (IV) or (V) and at a temperature ranging from about 25° C. to about 250° C.

References Cited

UNITED STATES PATENTS

| | | | |
|---|---|---|---|
| 2,846,472 | 8/1958 | Tiers | 260—543 F |
| 3,274,290 | 9/1966 | Goldberg et al. | 260—47 C |
| 3,560,553 | 2/1971 | Prichard | 260—543 F |

WILLIAM H. SHORT, Primary Examiner

E. WOODBERRY, Assistant Examiner

U.S. Cl. X.R.

117—161 R; 260—9, 17.2, 38, 79.3 M, 543 F, 849, 860, 874